United States Patent
Kleinman et al.

(10) Patent No.: US 7,434,165 B2
(45) Date of Patent: Oct. 7, 2008

(54) PROGRAMMED APPARATUS AND SYSTEM OF DYNAMIC DISPLAY OF PRESENTATION FILES

(76) Inventors: Lawrence Charles Kleinman, 535 N. 27th St., Allentown, PA (US) 18104; Daniel Nathan Zenchelsky, 497 San Benito Ave., Los Gatos, CA (US) 95030

(*) Notice: Subject to any disclaimer, the term of this patent is extended or adjusted under 35 U.S.C. 154(b) by 639 days.

(21) Appl. No.: 10/317,619

(22) Filed: Dec. 12, 2002

(65) Prior Publication Data

US 2004/0113934 A1 Jun. 17, 2004

(51) Int. Cl.
*G06F 3/00* (2006.01)
(52) U.S. Cl. .................. 715/732; 715/730; 715/731; 715/733
(58) Field of Classification Search ......... 715/730–734, 715/700, 705–713
See application file for complete search history.

(56) References Cited

U.S. PATENT DOCUMENTS

| | | | |
|---|---|---|---|
| 5,640,522 A | 6/1997 | Warrin | |
| 5,781,190 A * | 7/1998 | Gorbet et al. | 715/748 |
| 5,838,301 A | 11/1998 | Okamoto et al. | |
| 5,859,623 A * | 1/1999 | Meyn et al. | 715/730 |
| 5,926,624 A | 7/1999 | Katz et al. | |
| 6,034,679 A | 3/2000 | McGrath | |
| 6,037,943 A * | 3/2000 | Crone et al. | 715/730 |
| 6,072,479 A | 6/2000 | Ogawa | |
| 6,078,005 A | 6/2000 | Kurakake et al. | |
| 6,108,001 A | 8/2000 | Tuttle | |
| 6,314,570 B1 | 11/2001 | Tanigawa et al. | |
| 6,317,141 B1 | 11/2001 | Pavley et al. | |

(Continued)

FOREIGN PATENT DOCUMENTS

EP 0 355 627 A2 2/1990

OTHER PUBLICATIONS

International Search Report dated Nov. 30, 2004 for PCT Application No. PCT/US03/38693.

(Continued)

*Primary Examiner*—Simon Ke
(74) *Attorney, Agent, or Firm*—Duane Morris LLP

(57) ABSTRACT

A method of preparing and displaying a cumulative presentation and a presentation system are provided. A listing of available individual presentation files is provided through a user interface. Each of the presentation files comprises a plurality of presentation slides. A user is queried through the user interface to select presentation files from the available individual presentation files for inclusion in a cumulative presentation in a selected presentation order. A listing of presentation files selected by the user is displayed in the user interface. In response to a first command received from the user, a first slide from a first presentation from the cumulative presentation is provided to a display device for display thereon. In response to a second command received from the user, a second slide from the cumulative presentation is provided to the display device for display thereon.

70 Claims, 11 Drawing Sheets

U.S. PATENT DOCUMENTS

| | | |
|---|---|---|
| 6,330,004 B1 | 12/2001 | Matsuzawa et al. |
| 6,560,637 B1 * | 5/2003 | Dunlap et al. ............... 709/204 |
| 6,760,045 B1 | 7/2004 | Quinn et al. |
| 6,938,032 B1 * | 8/2005 | Heath et al. .................... 707/2 |
| 2002/0018075 A1 | 2/2002 | Maulik et al. |
| 2002/0036652 A1 | 3/2002 | Masumoto et al. |
| 2002/0054160 A1 | 5/2002 | Partridge et al. |
| 2002/0109712 A1 | 8/2002 | Yacovone et al. |
| 2005/0055643 A1 * | 3/2005 | Quimby ..................... 715/763 |
| 2005/0086200 A1 | 4/2005 | Kirkman et al. |
| 2006/0288293 A1 * | 12/2006 | Karasawa et al. ........... 715/730 |

OTHER PUBLICATIONS

PPT97: How to Write and Use a List File in PowerPoint Viewer, Microsoft Knowledge Base Article—Q190091, Jul. 23, 1998.

Supplementary Search Report dated Apr. 25, 2007 for European Patent Application No. 03 79 6691.8.

* cited by examiner

Cumulative Presentation Order
1. Dr_C_Presentation
2.
3.
4.
5.
6.
7.

A: Dr_A_Presentation.PPT
   Dr_B_Presentation.PPT

D: Dr_C_Presentation.PPT
   Dr_D_Presentation.PPT

H: Dr_E_Presentation.PPT

Select Media | Organize | Clear List | Save Presentation | Display

FIG. 2A

A: Dr_A_Presentation.PPT
Dr_B_Presentation.PPT

D: Dr_C_Presentation.PPT
Dr_D_Presentation.PPT

H: Dr_E_Presentation.PPT

Cumulative Presentation Order
1. Dr_C_Presentation
2. Dr_A_Presentation
3. Dr_B_Presentation
4. Dr_E_Presentation
5. Dr_D_Presentation
6.
7.

Select Media | Organize | Clear List | Save Presentation | Display

FIG. 2C

| Cumulative Presentation Order |
| --- |
| 1. Dr_C_Presentation |
| 2. Dr_E_Presentation |
| 3. Dr_A_Presentation |
| 4. Dr_B_Presentation |
| 5. Dr_D_Presentation |
| 6. |
| 7. |

A: Dr_A_Presentation.PPT
Dr_B_Presentation.PPT

D: Dr_C_Presentation.PPT
Dr_D_Presentation.PPT

H: Dr_E_Presentation.PPT

[Select Media] [Organize] [Clear List] [Save Presentation] [Display]

| Presentation Order |
|---|
| 1. Dr_C_Presentation |
| 2. Dr_A_Presentation |
| 3. Dr_B_Presentation |
| 4. Dr_E_Presentation |
| 5. Dr_D_Presentation |
| 6. |
| 7. |

A: Dr_A_Presentation.PPT

D:

H: Dr_E_Presentation.PPT

[Reorganize] [Add] [Delete]

PROGRAMMED APPARATUS AND SYSTEM OF DYNAMIC DISPLAY OF PRESENTATION FILES

FIELD OF THE INVENTION

The present invention relates to display devices and systems, and more particularly to display devices and systems for dynamic control of presentations.

BACKGROUND OF THE INVENTION

The use of presentation software for presenting electronic "slideshows" has become ubiquitous today. The most popular presentation software is currently the "POWERPOINT®" software package sold by Microsoft Corporation of Redmond, Wash. Typically, a laptop computer having a copy of the POWERPOINT software is connected to a display device. A POWERPOINT presentation file in the ".ppt" or ".pps" format, which has been previously created by the presenter, is executed by the software resident on the laptop computer and a slideshow is displayed on the LCD screen of the laptop and/or sent to the display device (e.g., a LCD projector) and projected to a screen for display to an audience.

Oftentimes, more than one presentation is scheduled for an event, such as an academic conference or business meeting. Each presentation can and often is associated with a separate slideshow presentation. These multiple presentation events are accommodated in one of two ways. In a first approach, each presenter has his or her own laptop with a copy of the POWERPOINT software and a copy of the presenter's presentation file. After each presentation is given, the presenter's laptop is disconnected from the display device and the next presenter's laptop is connected thereto. This often causes delays as cables are physically disconnected from one laptop and reconnected to the next laptop. Further, the presenter may have to locate the presenter's presentation on the presenter's machine and launch the presentation in the "full-screen" mode to begin the slideshow. The audience waits through and witnesses this ritual, including viewing any aspects of the presenter's computer desktop before the full-screen mode is presented. Further, the laptop may not be correctly configured to display on the display device. This event requires adjustments to be made for which the presenter is often not familiar, thereby requiring assistance by a more qualified person and perpetuating the aforementioned delay and unwanted displays.

In a second approach, all of the presentations of the various presenters are loaded into a single laptop computer connected to the display device. In this case, transitioning between presentations requires the first presenter to close the presenter's presentation and the subsequent presenter to open up his or her respective presentation. Again, delay results from this routine, and the transition events (e.g., opening and closing of presentations and desktop display) are shown to the audience.

In still yet another approach specific to POWERPOINT presentation software, POWERPOINT VIEWER software—a viewing software application for POWERPOINT presentations—allows a user to run multiple POWERPOINT slideshows, one right after another, by executing a playlist (.1st) file. The playlist file must contain the full pathname information for each presentation when each file is located in a file outside of the folder where the viewer executable file (PPVIEW32.exe) is located. The user creates the playlist using a text editor, such as a notepad software application, and saves the file with the ".1st" extension. While this approach provides for a more seamless presentation of a plurality of presentations files, control and modification capabilities are severely limited. During playback, no changes to the ordering of the presentation files or additions or deletions to the playlist are possible. In essence, a new, modified playlist textual file must be created using a text editor to define the new play order and this new file must then be executed from its beginning. This is not a practical solution during presentations. Further, navigation between individual presentations in the playlist is limited. For example, during playback of the playlist, the user cannot move from the first slide of a presentation directly to the last slide of a previous presentation.

A presentation system with some limited flexibility is described in U.S. Pat. No. 6,108,101 to Tuttle, entitled "Dynamic Control of Visual and/or Audio Presentation" issued Aug. 22, 2000, the entirety of which is hereby incorporated by reference herein. Tuttle describes a presentation system including a personal computer connected to a LCD projector. The personal computer executes a play story program and various software routines. A story list file including a list of all "stories" that are initially included in a particular presentation and a default sequence for presenting them is loaded into the personal computer. A directory is fetched from an external storage that includes the name and location of all stories. Once the play story program is executed, it reads an incremented story list counter to identify the first story and then reads the directory to obtain the address of the first story in external storage. An I/O subsystem then fetches the first story from external storage into RAM for presentation. The system allows some control over the presentation ordering during display of the cumulative presentation, but is still dependent upon a static playlist and does not allow for modifications of the playlist of "stories" (e.g., additions, deletions, or reordering) without interrupting the story currently being played. Put another way, the user can immediately command the play of a story that is not the next story defined in the playlist, but this requires either the interruption of a present story or a wait until completion of the present story. Still further, multiple changes, such as reordering of multiple stories, cannot be accomplished without manually commanding the play of each story when desired.

Greater flexibility in group presentations is often desired, such as to accommodate changes in presentation ordering and additions and deletions of presentations, both before the beginning of a group presentations and during the group presentation. Therefore, there is a need for a presentation system that allows for more flexible display of multiple presentations, while eliminating unseemly delays and displays that occur in between individual presentations.

SUMMARY OF THE INVENTION

A method of preparing and displaying a cumulative presentation and a presentation system are provided. A listing of available individual presentation files is provided through a user interface. Each of the presentation files comprises a plurality of presentation slides. A user is queried through the user interface to select presentation files from the available individual presentation files for inclusion in a cumulative presentation in a selected presentation order. A listing of presentation files selected by the user is displayed in the user interface. In response to a first command received from the user, a first slide from a first presentation from the cumulative presentation is provided to a display device for display thereon. In response to a second command received from the user, a second slide from the cumulative presentation is provided to the display device for display thereon.

A method of manipulating a presentation order of presentations in a cumulative presentation and a presentation system are also provided. The cumulative presentation comprises a plurality of presentations files each including a plurality of presentation slides. A listing of presentations included in the cumulative presentation is provided to a user through a user interface. Without interrupting a presentation currently being displayed from the cumulative presentation, the presentation order of the presentations in the cumulative presentation is reconfigured in response to a reconfiguration command received from the user.

The above and other features will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIG. 7 illustrates an exemplary graphical user interface for reconfiguring a cumulative presentation during display of said cumulative presentation.

DETAILED DESCRIPTION

Figure 1:
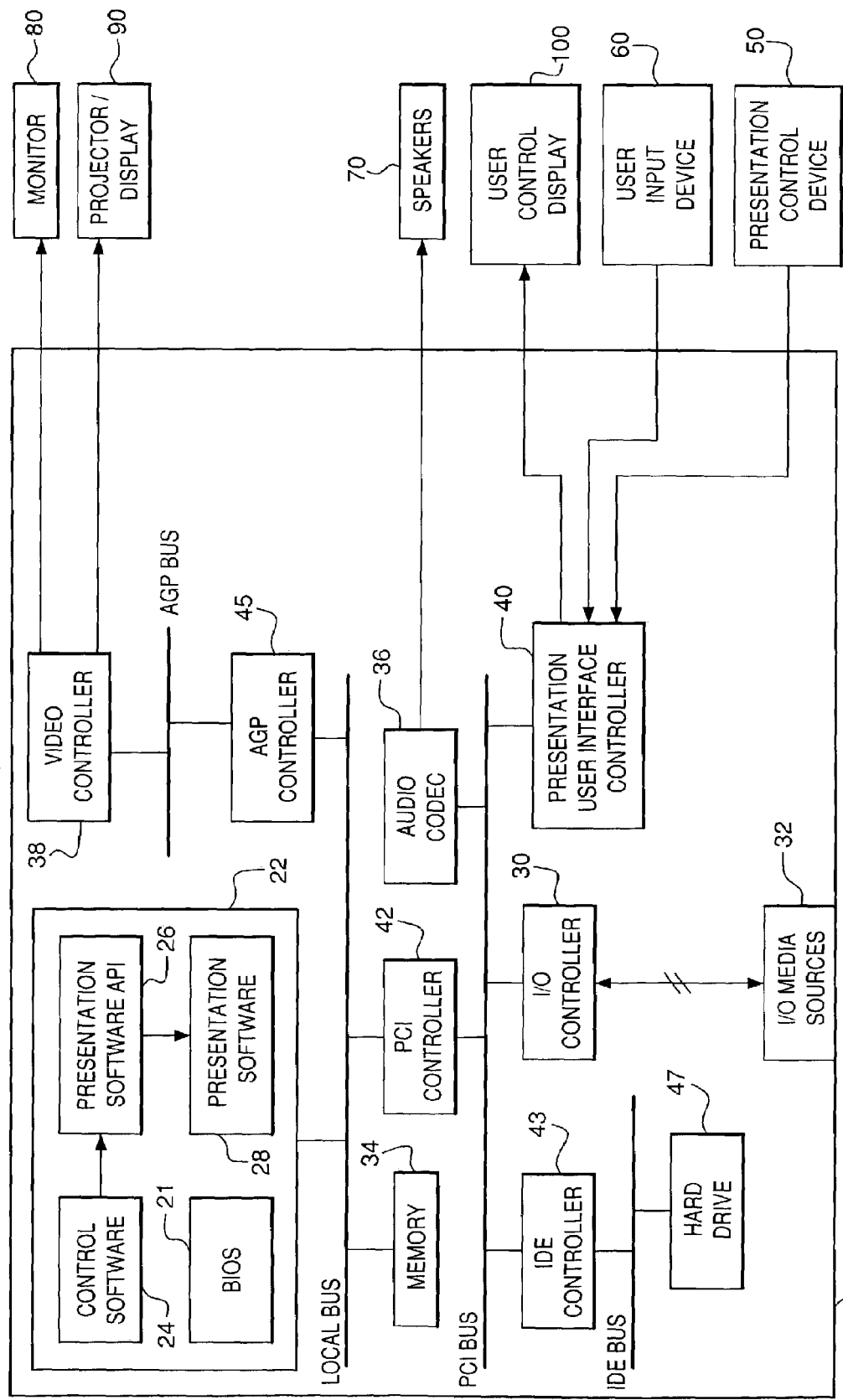
FIG. 1 is a block diagram of an exemplary presentation system.

FIG. 1 is a block diagram of an exemplary embodiment of a presentation system 10 including a programmed processor 20. The processor 20 includes a central processing unit 22 programmed with control software 24, presentation software application programming interface (API) 26 and presentation software 28. In an exemplary embodiment, the operating system for processor 20 is a windows-based operating system, such as MICROSOFT WINDOWS XP. The processor 20 may include many of the components considered standard in today's desktop or laptop computers, and one of ordinary skill should realize that the configuration of these components may differ from that shown in FIG. 1. Processor 20 includes busses and corresponding controllers, such as an IDE (Integrated Drive Electronics) bus and IDE controller 43, a PCI (Peripheral Component Interconnect) bus and PCI controller 42, a local system bus and an AGP (Accelerated Graphics Port) bus and AGP controller 45, system memory 34 (i.e., volatile memory (RAM)) and nonvolatile memory (hard drive 47, floppy drive, CD-ROM drive and the like), I/O controller 30 and basic input/output system (BIOS) software 21. The I/O controller unit 30 is coupled to I/O media sources 32.

I/O media sources 32 can include any or all of the following: a floppy disk drive, a CD-ROM, CD-R, CD-R/W (or compatible) drive, DVD-ROM, DVD-R, DVD-R/W, DVD+R/W (or compatible) drive, Iomega ZIP drive, digital memory device (e.g., CompactFlash portable storage device, Memory Stick portable storage device, SmartMedia portable storage device or Secure Digital portable storage device), digital tape, portable hard drive or any other storage device. Still further, a media source may be another computer processor and I/O media sources 32 may include a wired connection, such as a USB port, wired network card (e.g., Ethernet card), or modem, or wireless connection, such as an infrared port or RF port that facilitates communications via the 802.11a, 802.11b or BlueTooth protocols, for receiving and transmitting files from or to a remote computer processor that contains media.

Processor 20 also includes Presentation User Interface Controller 40 connected to user control display 100, user input device 60 and presentation control device 50, the details of which are described below. Programmed processor 20 may also includes an audio codec 36, which may be connected to speakers 70, headphones or earphones. The processor 20 also preferably includes at least one video controller 38, shown connected to the local bus and CPU 22 through AGP controller 45 and the AGP bus. The video controller 38 may output video in one or more video formats, including VGA, S-video, composite video or other video format. Video controller 38 is preferably connected through an appropriate video port to a display device, such as a projector 90 and/or a monitor 80. The monitor 80 may be, for example, a LCD or CRT display. Likewise, the projector 90 may be a CRT, LCD or other type of video projector. This connection may be either wireless or hardwired. As described in more detail below, video controller 38 provides the video signal for a cumulative presentation to monitor 80 and/or projector 90. In one embodiment, presentation user interface controller 40 provides a video signal to user control display 100 corresponding to a graphical user interface, specifically a dialog box or window, that allows the user to interact with the processor 20 via user input device 60. A second video controller may optionally be connected to the AGP bus to provide this second video signal.

Although the preferred method of interacting with the user, such as displaying information to the user and querying the user for information or instructions, is described by means of a graphical user interface and, more specifically, dialog boxes or windows, it is contemplated that other user interfaces may also be utilized, such as LED displays or other means of communicating with the user.

The use and operation of the system 10 of FIG. 1 is described hereafter in connection with FIGS. 2-7, specifically with respect to the creation, display and modification of a cumulative presentation. An exemplary embodiment of the system 10 is described using POWERPOINT presentations, but it should be understood that the system is not limited to this form of presentation file or to any particular form of media. Rather, a presentation includes a group of slides, which may include still images, audio, video or combinations thereof. To that end, presentation software 28 may include software for playing video and audio or other media, including, but not limited to, RealMedia/RealPlayer, QuickTime video and/or audio, MPEG video and/or audio, Windows Media video and/or audio, to name a few.

Figure 2:
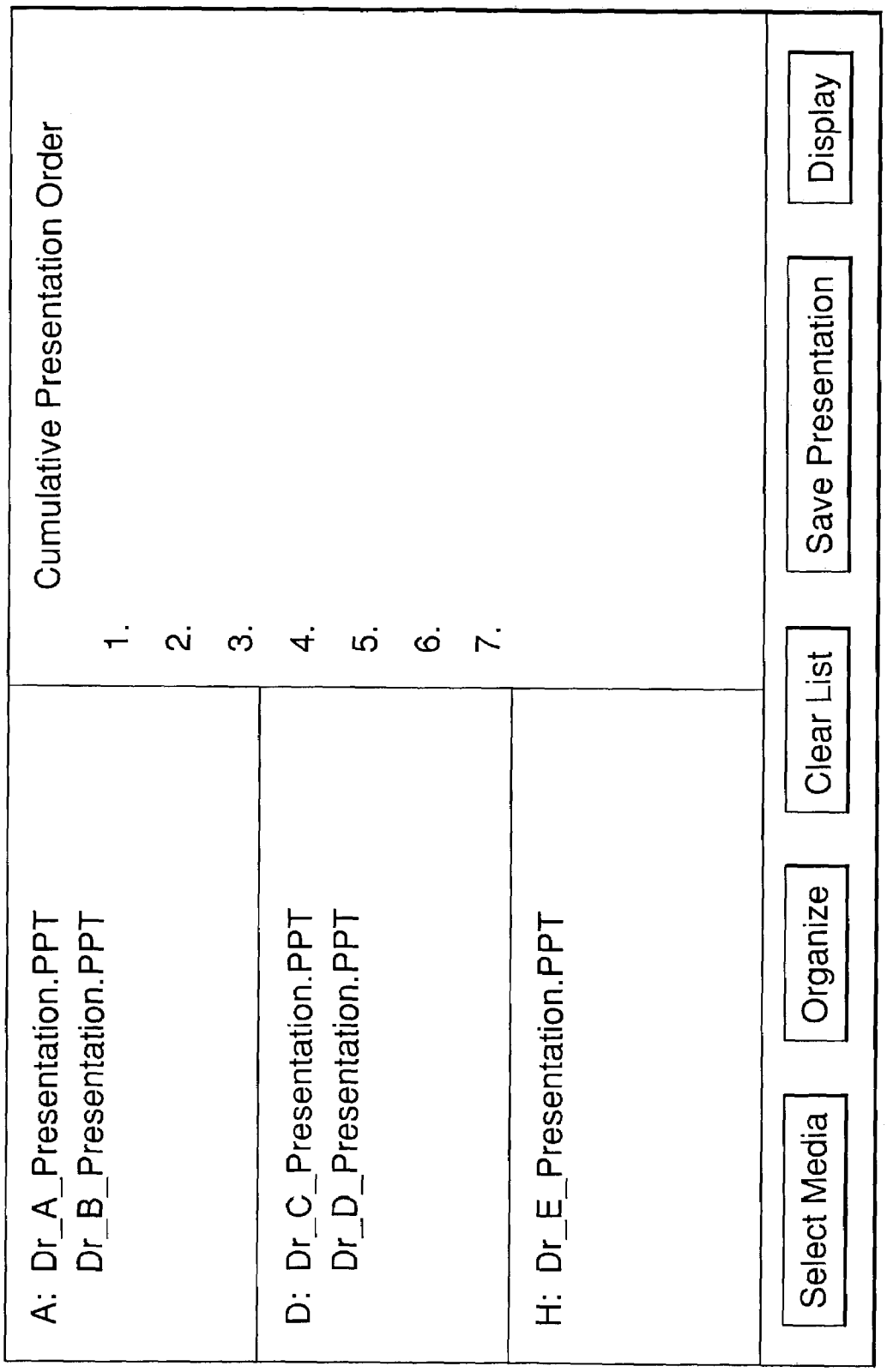
FIGS. 2-2D illustrate an exemplary graphical user interface for defining a cumulative presentation order.

FIG. 2 illustrates an exemplary graphical user interface, more specifically a dialog box or window, presented by the control software 24 to a user control display 100 through presentation user interface controller 40. One of ordinary skill will recognize that the control software 24 may be based on any programming language, but C++ is utilized in one exemplary embodiment of programmed apparatus 20 and processing unit 22. The user interacts with the processor 20 through a user input device 60. Input device 60 may be a keyboard, mouse device, number pad, or combination thereof, or any other input device, the particulars of which are not important to the understanding of the system 10.

Figure 3:
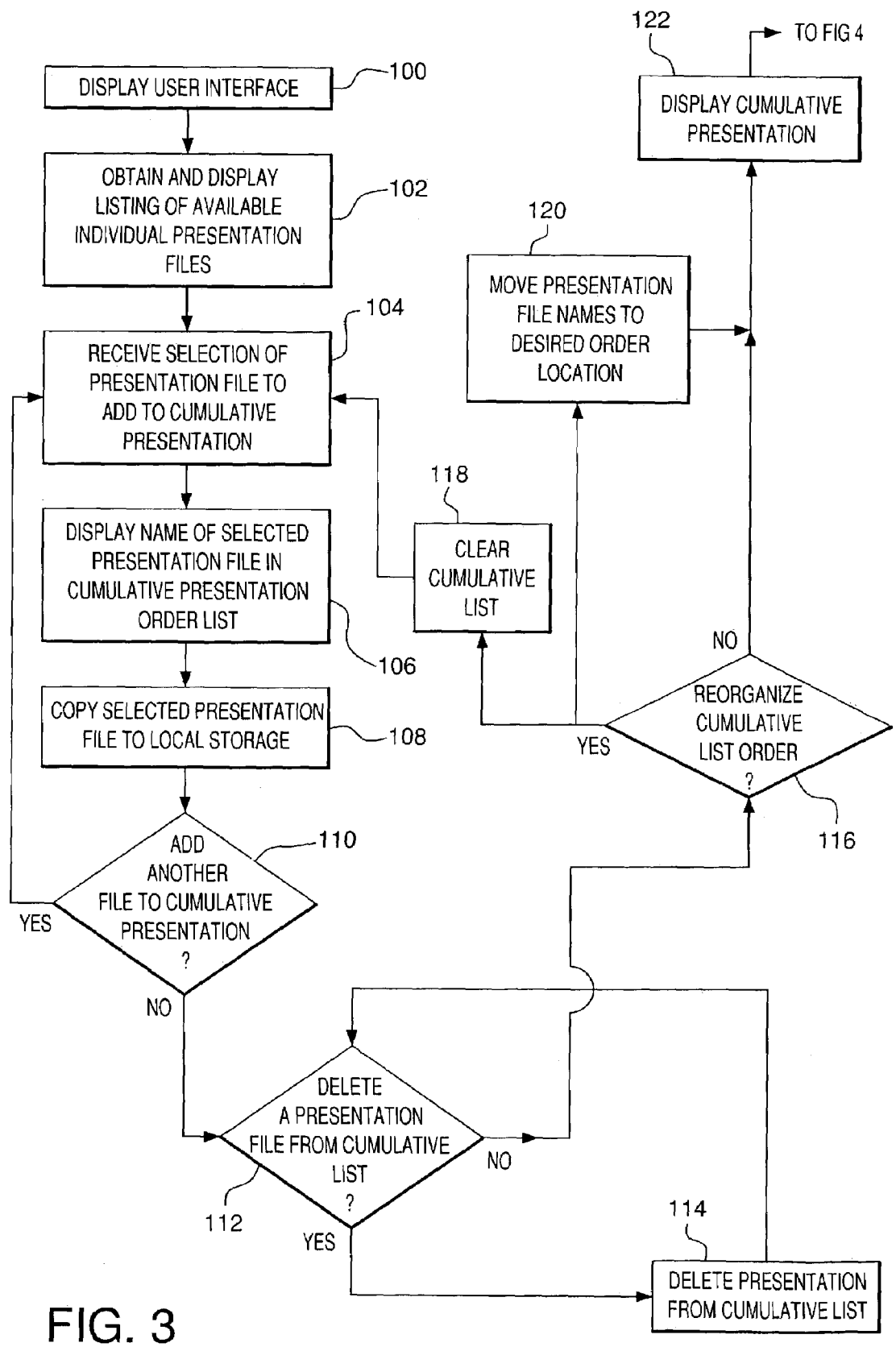
FIG. 3 is flow diagram illustrating the development of a cumulative presentation from a plurality of individual presentations.

FIG. 3, in connection with FIGS. 2-2D, describes the operation of the control software in organizing a cumulative presentation from a plurality of individual presentation files. At step 100, the control software 24 displays the graphical user interface of FIG. 2 after the processor 20 is turned "on." This may occur immediately after boot up or after a user launches the software application. At step 102, the control software 24 obtains through I/O controller 30 a list of any presentation files, such as POWERPOINT presentation files (.ppt (standard PowerPoint file format) or .pps (a PowerPoint format that opens up PowerPoint directly into slideshow view)) available at the I/O media sources 32. A listing of these individual presentation files is displayed to the user in the graphical user interface of FIG. 2 on user control display 100. Assume for example that drive "A:" represents a floppy drive, drive "D:" represents a CD-ROM drive, and drive "H:" represents a network drive, each available as a media source 32. The graphical user interface indicates that there are two presentation files on a floppy diskette in drive A, two presentation files on a CD-ROM in drive D, and one presentation file on drive H. The presentation files from each media source that is currently connected to the processor 20 are preferably displayed simultaneously to the user in the graphical user interface, or the user can be provided with a menu of available I/O media sources 32, wherein the user selects a desired media source (e.g., the "A" drive) and its presentation files are displayed. Of course, the floppy diskette (or other respective storage media) presently in drive A (or other respective I/O media source 32) may be removed and a different diskette may be inserted. In that case, the presentation files available on the second diskette are then displayed to the user. An alternative approach to displaying available media is for the device to display only the source of media made most recently available (e.g., inserted or attached), or to preferentially display one or another source of media and to allow the user to cycle through the available sources, or some combination of these approaches. In this manner, the processor 20 is provided access to the presentation files of several different presenters, such as may be necessary at a conference.

At step 104, the control program 24 receives a selection of a presentation file to add to a cumulative presentation. This selection may be made by the user using user input device 60. The actual selection may be made in any number of ways. For example, if the user input device 60 is a pointer device, such as a mouse device, the user can select the desired individual presentation file by pointing to the file on the graphical user interface and selecting the file by "clicking" on it. The user can then drag the file over to the "Cumulative Presentation Order" window in the graphical user interface. Another option would be to "double-click" on the file, whereby the control program 24 automatically adds the file to the first location in the cumulative presentation order. Alternatively, the use can select the "select media" button and the file is then added to the cumulative presentation order. Regardless of how the control software 24 is configured to query the user for a presentation order selection to enable or allow the user to select the media file for inclusion in the cumulative presentation order, the media file is added to the cumulative presentation order, and the name of the selected presentation file is displayed to the user in the Cumulative Presentation Order window of the graphical user interface (step 106) as shown in FIG. 2A. The selected presentation is preferably placed in the first order position of the cumulative order, but this is not a requirement. The user could, for example, opt to define the cumulative presentation from the last order position to first order position or in some random manner.

In one embodiment of the invention, the programmed processor 20 allows the user to select presentations for inclusion in the cumulative presentation at selected slot location in the cumulative presentation. Assume speakers one and five in a symposium are from the same company and have a single diskette containing both of their respective presentation files. The presentations could be added to the cumulative presentation list as presentations one and five after the diskette is inserted at I/O media source 32, leaving the other slots open. The next presentation added to the cumulative presentation is then automatically placed in the earliest available slot (in this case, the second slot) unless the user directed it to another randomly accessible slot, such as the third slot. The user also has the option to have new presentations appended to the end of a current list instead of at the earliest unfilled spot (e.g., spot number six). If another presentation were added at slot number four, then slots one, three, four and five would be occupied with presentations. If the cumulative presentation is then displayed (as described below) and no new presentation is added thereto at slot number two, the device displays the cumulative presentation as if it were comprised of four presentations at slots one through four. As described below, presentation two could be added as presentation one is being displayed, and if the cumulative presentation is then saved, it can be saved with the original assigned positions or with the presentation as displayed, at the user's option.

The user interface for configuring and modifying the cumulative presentation may be textual, numeric or pictorial. An example of the latter interface would be an interface that allows the user to drag and drop (using user input device 60) presentations into pictorial representations of cubby holes, for example, or onto icons representing empty or full slots. The device may be configured in a variety of ways to address attempts to place presentations into occupied slots. For example, the device could verify the user's intent to place the presentation into that slot, could offer to replace the existing presentations in the slot, or could prompt a shift of all subsequent presentations by one spot (or until each presentation is in an open slot), to name a few.

Figure 2B:
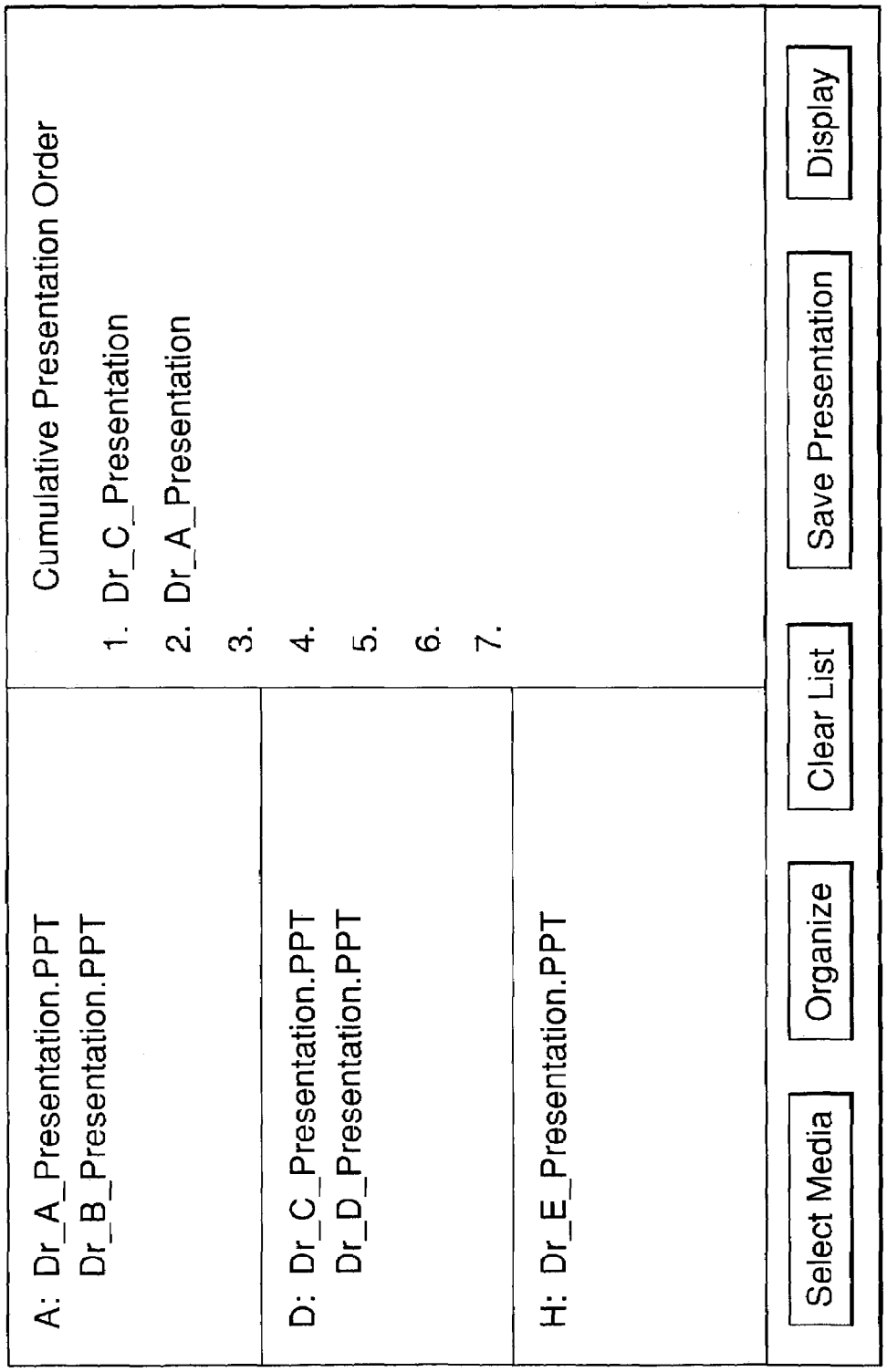

After a user has selected a presentation file and its name is added to the cumulative presentation order list, the control software 24 preferably directs that the selected presentation file is copied from the appropriate I/O media source 32 associated with the presentation file to local storage in system memory 34 or hard drive 47 (step 108). At 110, the user decides whether to add additional presentation files to the cumulative presentation list. Because the system 10 arranges and displays cumulative presentations from a plurality of individual presentations, the user selects at least one more presentation file for addition to the cumulative order in the manner described above. For example, if the user selects "Dr._A_Presentation.PPT" as the second presentation, it is added to the cumulative presentation order, the graphical user interface is updated and displayed to the user as shown in FIG. 2B, and the selected presentation file is copied to local storage (steps 104-108). In this manner, the user can define and develop from scratch a cumulative play order of presentations as shown in, for example, FIG. 2C from a plurality of different media sources 32 and through a user friendly graphical interface.

If the user does not wish to add any additional presentation files to the cumulative presentation list at step 110, control software 24 provides the user the option of deleting files from the cumulative presentation order at 112. If the user decides to delete a presentation from the list at 112, a presentation from the list is selected by the user and removed from the list at 114, and the list is redisplayed to the user without the removed presentation file. Using the user input device 60, the user can select the desired file from the cumulative presentation order window of the graphical user interface by "clicking" on its name and choose "select media," drag the file off of the window to a virtual "trash can," select a "delete" button (not shown) or otherwise remove the presentation file from the list. The cumulative list order is then updated to reflect the remaining presentation files.

The user may want to reorganize the cumulative presentation list at step 116 if the user does not want to delete a file from the cumulative presentation list at step 112 or after the user has deleted a presentation file from the list. This may be accomplished in any of several manners. As shown at step 118, the user can simply clear the entire cumulative list order and begin with the empty list shown in FIG. 2. This may be done by selecting the "clear list" button from the user interface. Thereafter, the user can create a new list as described above via steps 104-110. Alternatively, at step 120 the user can simply click on a selected presentation from the cumulative order list and drag it to the desired order spot. For example, the user may select the fourth presentation (Dr_E_Presentation) from the interface of FIG. 2C and drag it to the second order spot using the user input device 60. Thereafter, the unselected presentations are shifted accordingly, and the updated cumulative presentation list is shown in the graphical user interface of FIG. 2D.

Although shown in a particular order in FIG. 3 for purposes of explanation, it should be understood that the user can utilize the add, delete and reordering options in any selected order and combination to achieve the desired cumulative presentation order. The user can use these options multiple times, and as explained herein, use these options before, during and after display of the cumulative presentation.

Once the user has created the presentation order for the cumulative presentation in the manner described above, the user can then present the cumulative presentation to the audience using the system 10 at step 122. This feature is described below in connection with FIG. 4 and the control software 24, presentation software API 26 and presentation software 28. In an exemplary embodiment of the present system 10, Presentation Software 28 is a POWERPOINT software application such as POWERPOINT Viewer software and Presentation Software API 26 is the POWERPOINT Viewer API. The API 26 allows an external software program such as control software 24 to interface with Presentation Software 28 and control the functions of the Presentation Software 28. Although the present embodiment is described in connection with POWERPOINT software, other presentation software may be utilized for other media file formats (e.g., QuickTime, etc.). Also, the presentation software functionality can be programmed directly within control software 24.

Figure 4:
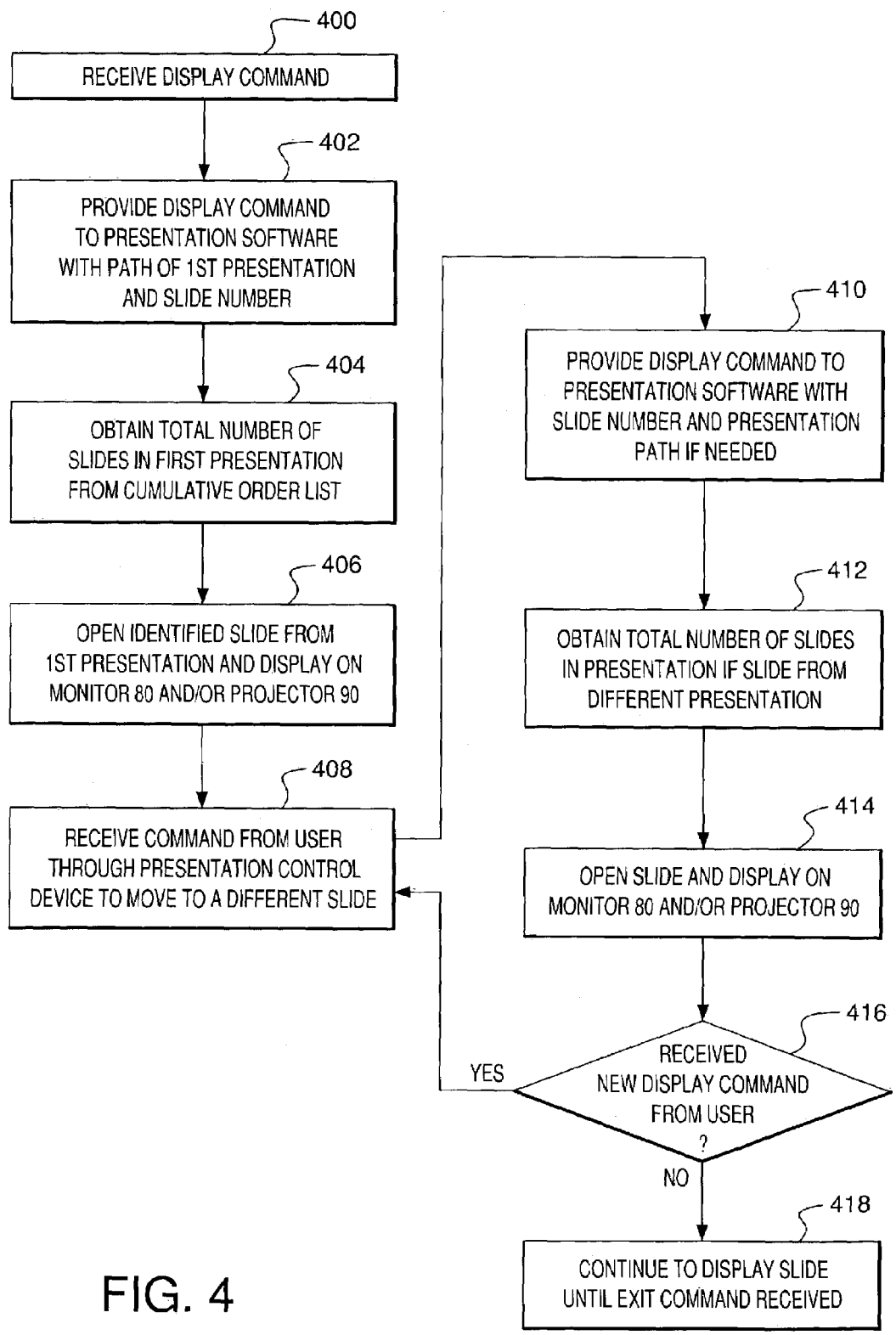
FIG. 4 is a flow diagram illustrating the display of a cumulative presentation.

Referring to FIG. 4, control program 24 receives a display command from the user through the graphical user interface (FIG. 2) and user input device 60 (step 400), i.e., by selecting the "DISPLAY" button from the interface of FIG. 2 with a mouse device. Alternatively, the display command may be received from the user via presentation control device 50, e.g., by selecting a display button (not shown in FIG. 5 described below). The control program 24 then presents a cumulative presentation according to the cumulative presentation order established as described above. The cumulative presentation may include a plurality of individual presentations with each individual presentation including at least one presentation slide, and more likely a plurality of presentation slides.

The control program 24 maintains a list of the presentations selected for inclusion in the cumulative presentation as described above. In an exemplary embodiment, this list is a linked list described below in more detail in connection with FIGS. 6-6D and 7. After the display command is received at step 400 from the user, the control program 24 provides a display command or commands at step 402 to the presentations software 28 along with the name (or full pathname if needed) of the first listed presentation and an identification of the slide number to be displayed, e.g., the first slide from the first presentation. The pathname identifies the name of the presentation and any directories in system memory 34 or hard drive 47. The control program 24 also obtains the total number of slides in the first presentation from the cumulative order list (step 404).

In an exemplary embodiment, the display command 402 is provided to POWERPOINT Viewer presentation software 28 through the POWERPOINT Viewer software API 26. The NewShow( ) function can be called by the control program 24 to load a presentation and display the first slide. For example, API "LPDISPATCH_Application::NewShow(LPCTSTR FileName, Long AdvanceMode, long Kiosk)" implements the NewShow( ) function that loads a PowerPoint file and displays a first slide. It accepts a filename and two flags that control the behavior of the POWERPOINT Viewer.

API "long SlideShowView::GetSlidesCount( )" may be used to obtain the number of slides in a file at step 404. The API implements the "GetSlidesCount( )" function that returns the number of slides in a slideshow that was opened with the NewShow( ) API.

API "void SlideShowView::GotoSlide(long Index, long ResetSlide)" implements the "GotoSlide( )" function to facilitate a jump to a particular slide. This command accepts the index number of the slide to be displayed and a flag that controls the behavior of the viewer. This function may be utilized as described hereafter.

At step 406, the presentation software 28 then opens the identified slide from the first presentation in a full screen slideshow and displays the slide on the monitor 80 and/or projector 90. This video signal is provided through video controller 38.

The cumulative presentation and individual slideshows are then controlled via the presentation control device 50. For example, the control software 24 may receive a command from a user through presentation control device 50 and presentation user interface controller 40 to move to a different slide (step 408). The different slide may be a different slide from the presently displayed slideshow from the cumulative presentation or a slide from a completely different presentation included within the cumulative presentation. The control software 24 then provides the display command to the presentation software 28 through the API 26 including the number of the slide to be displayed (step 410). If the slide is from a completely different presentation, the control software 24 obtains the total number of slides in the presentation at step 412 in the manner described above. There is no need to obtain this number if the requested slide is contained within the presentation currently being displayed or one that has already been displayed. The control software 28 also provides the pathname information for the presentation if needed, i.e., if the presentation is not the same as the presentation currently being displayed at step 406. The GotoSlide function is utilized (as described below) if the requested slide is not the first slide from a presentation. The user-requested slide is then displayed on the monitor 80 and/or projector 90 (step 414). The control software 24 then waits at step 416 for a new display command from the user, i.e., a command to display a different slide. Any newly requested slide is then displayed as described above at steps 408-414. If no new slide is requested for display, the slide displayed at step 414 remains displayed until the control software 24 receives an exit command via presentation control device 50.

Optionally, the control software 24 can be configured to automatically progress to the next slide based on a pre-programmed timeout value. The timeout value may be embedded in the POWERPOINT file per standard POWERPOINT functionality (or other utilized media file format) or it may be configured within the control software 24 itself. If it is configured within the control software 24, there may be a timeout value individually associated with each slide, individually associated with each presentation, globally associated across all presentations, or in any combination thereof. Information associated with a presentation or slide may be stored in the nodes of the linked list along with the other data described below.

In the event that the user commands the display of a slide from a different presentation at step 408, and assuming the presentation software 28 is Power Point Viewer software, the PowerPoint Viewer default is to automatically display the first slide in that presentation. Assuming viewer software 28 includes this default feature, and assuming the user commanded the display of a slide that is not the first slide of the different presentation, this limitation can be addressed by blanking the screen prior to invoking the NewShow( ) function call and un-blanking the screen after the GotoSlide( ) function call. To jump to a slide that is not the first slide of a different presentation (e.g., the third slide from the different presentation), an exemplary process flow is as follows: (1) the display is blanked; (2) the NewShow( ) function is called with the path of the presentation; (3) the GetSlidesCount( ) function is called to obtain the number of slides; (4) the GotoSlide( ) function is called with the appropriate slide number to which to jump; and (5) the screen is then unblanked. The blanking step may be accomplished by creating a full screen sized window of a solid color that is prioritized above all other screen content, thereby preventing any other screen content from being displayed.

It should be understood that the presentation control device 50 can be configured in many different ways to allow the user to control the cumulative slideshow. For example, an exemplary control device 50 may include a keypad 500 shown in FIG. 5. The control device 50 may be wired to the programmed processor 20 or be a wireless device that communicates with an RF or infrared port of the programmed processor 20. An exemplary keypad 500 includes number keys 502 that allow the user to specifically input the presentation number and/or slide number to be displayed. For example, assume that the first slide from the first presentation is currently being displayed. The user may select the "slide number" button 508, enter "5" to represent the fifth slide from the first presentation, and select the "enter" key 504. The control software 24 receives this command at steps 416 and 408, and provides the display command for the fifth slide to the presentation software at step 410. The fifth slide is then opened and displayed at step 414. As with other functions, this can occur without the user interface appearing on the projector/display 90 utilized to present the cumulative presentation to the audience.

The user may use the control device 50 to command the display of a slide from a different presentation by the following sequence: (1) selecting the "presentation number" button 506; (2) entering, for example, "3" to indicate the third presentation; (3) selecting the "slide number" key 508; (4) entering, for example, "4" to indicate the fourth slide; and (5) selecting the "enter" button 504. This command information is then provided to the control software 24 at steps 416 and 408. Since the user has commanded the display of a slide from a different presentation from the cumulative presentation order, the control software obtains the total number of slides from the presentation at step 412. The control software 24 then facilitates the display of the requested slide as described above in connection with steps 410 and 414.

The keypad 500 also preferably includes right and left arrow buttons 516 and 518, respectively. These buttons may be used to move through a slideshow one slide at a time. For example, assume that the first slide of the first presentation is currently displayed. Selecting the right arrow button 518 commands the control software 24 to display the second slide from the slideshow. This command is received by the control software 24 at steps 416, 408. The control software 24 then provides the display command at 410 to the presentation software including the number of the slide to be displayed, i.e., slide two, which is the next slide after slide one. Assuming that the present slide being displayed is the last slide in a presentation, selecting the right arrow 518 facilitates the display of the first slide from the next presentation in the cumulative presentation list developed as described above. In this event, the control software 24 also executes step 412 to identify the total number of slides from the next presentation and then provides the display command to the presentation software 28 including the pathname information for the next presentation from the list and the slide number, e.g., slide one.

The left arrow button 516 works in a similar manner, only to move backwards through a slideshow, e.g., to move from the second slide in a presentation to the first slide in a presentation or to move from the first side of a presentation to the last slide of a previous presentation. If a command is received via button 516 to move from the first slide of a presentation to the last slide of a previous presentation, it is not necessary to execute step 412 if the control software 24 has already obtained and stored in memory the total number of slides in the previous presentation.

Keypad 500 also preferably includes a "next presentation" button 512 and a "previous presentation" button 514. Selecting the "next presentation" button 512 requests the display of the first slide from the next presentation from the cumulative presentation order list. This is also accomplished via steps 416 and 408-414. Likewise, selecting the "previous presentation" button 514 requests the display of the first slide from the previous presentation from the cumulative presentation order list, again via steps 416 and 408-414.

Figure 5:
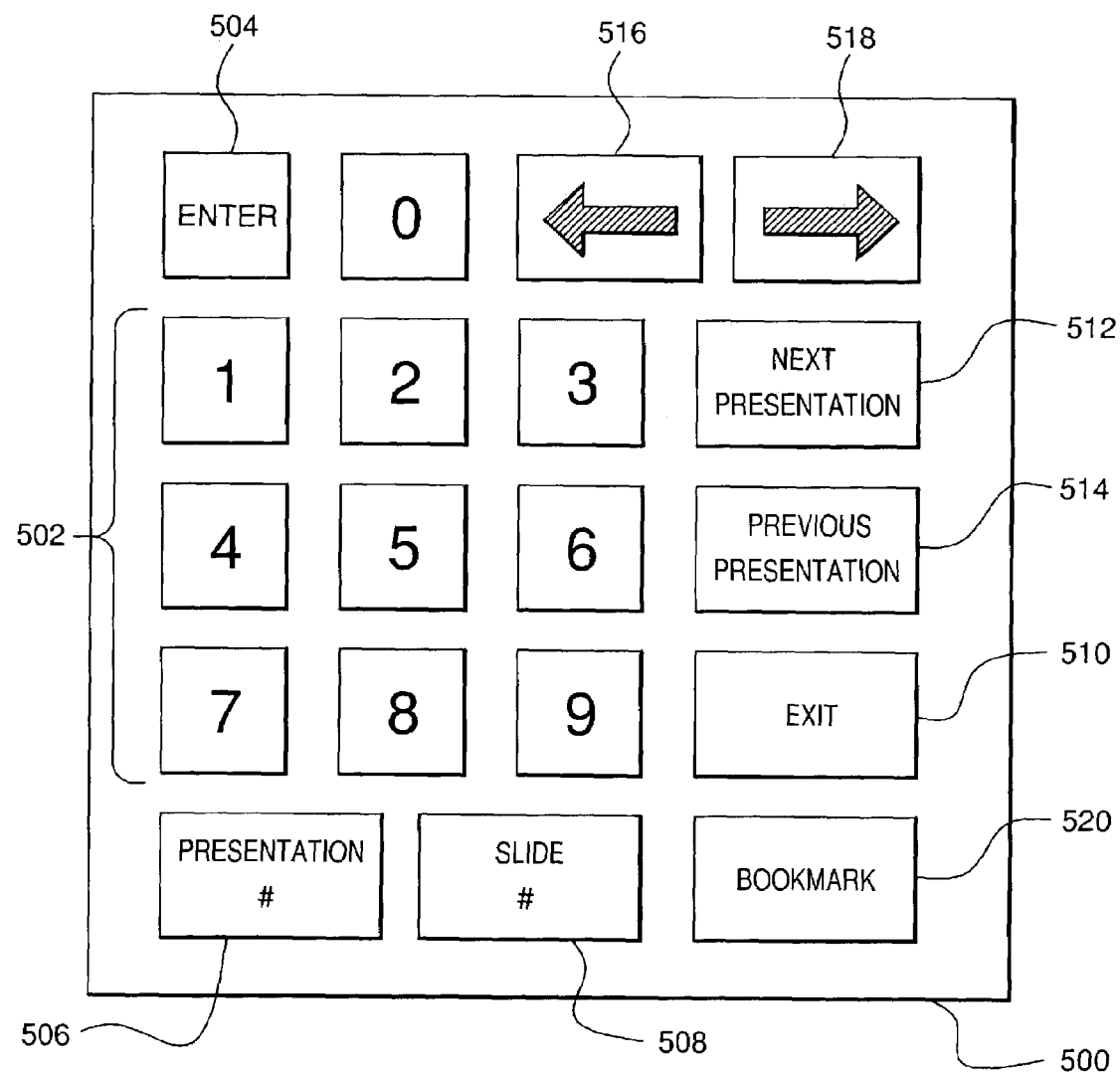
FIG. 5 illustrates an exemplary presentation control device.

As also shown in FIG. 5, the keypad 500 includes an "exit" key 510. This key provides a command to the control software 24 at step 418 to terminate the display of the presentation.

An exemplary presentation system 10 also provides the user with the ability to display a presentation from the cumulative presentation and edit the cumulative presentation order simultaneously. This feature allows for impromptu changes to the cumulative presentation without disrupting the presentation currently being provided. This feature recognizes that any number of events can require cumulative presentations to be changed "last minute" at events or require a presentation order change. For example, presenters can be late, absent or substituted for and/or presentation topics may be rearranged. This feature is described hereafter in connection with FIGS. 6A-6D and FIG. 7.

In one exemplary embodiment, the ordering of the cumulative presentation configured as described above is implemented as a linked list, and preferably a doubly linked list where each element or node includes a pointer to both the next and previous elements or nodes. This linked list may be created after a cumulative presentation is defined as described above. In one exemplary embodiment, the linked list is created when the display command is received at step 132 (FIG.

Figure 6A:
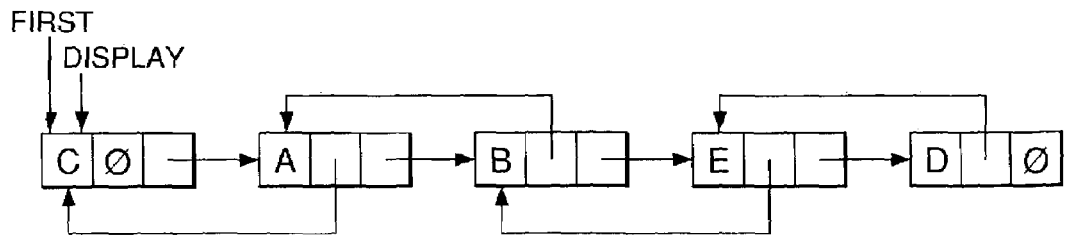
FIGS. 6A-6D illustrate a doubly linked list defining a cumulative presentation.

3). Referring to FIG. 6A, the presentation order defined by the user as explained above in connection with FIGS. 2A-2D and FIG. 3 is implemented as a doubly linked list. Assume that the presentation order defined by the user is, from first to last presentation as follows: Presentation C, Presentation A, Presentation B, Presentation E and Presentation D. Each element of the list is illustrated as having at least three components. In another embodiment, additional components may be stored as well, such as the aforementioned timeout values. A first component identifies the presentation file, e.g., Presentation C, or Presentation A, etc., by name (or full pathname if the files are located in a directory that is not the same for each element). A second component identifies a link to the previous element. For all elements except the first element, this previous pointer identifies the previous element of the list, e.g., the previous pointer for the third element (representing Presentation B) points to the second element (representing Presentation A). For the first element, a null value is provided for this previous pointer. A third component identifies a link to the next element. For all elements except the last element, this next pointer identifies the next element from the list, e.g., the next pointer for the second element (representing Presentation A) points to the third element (representing Presentation B).

Figure 6B:
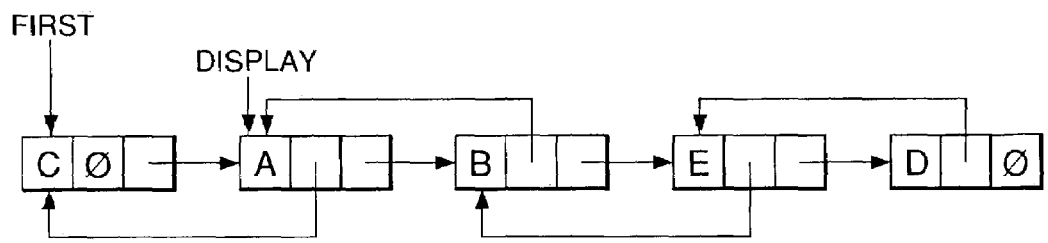

The list preferably has two pointers—a first presentation pointer and a display pointer. These pointers are utilized in the display of the individual presentations from the cumulative presentation described above in connection with FIGS. 4-5. The first presentation pointer identifies the first presentation from the linked list and, therefore, from the cumulative presentation defined by the user as described above. The display pointer identifies the presentation element that is currently being displayed. This display pointer is incremented or set to point to the next presentation element (or other presentation element from the list as the case may) of the linked list as shown in FIG. 6B when the user requests or commands the display of the next presentation (or other presentation as the case may be) as described above in connection with FIGS. 4-5.

Figure 6C:
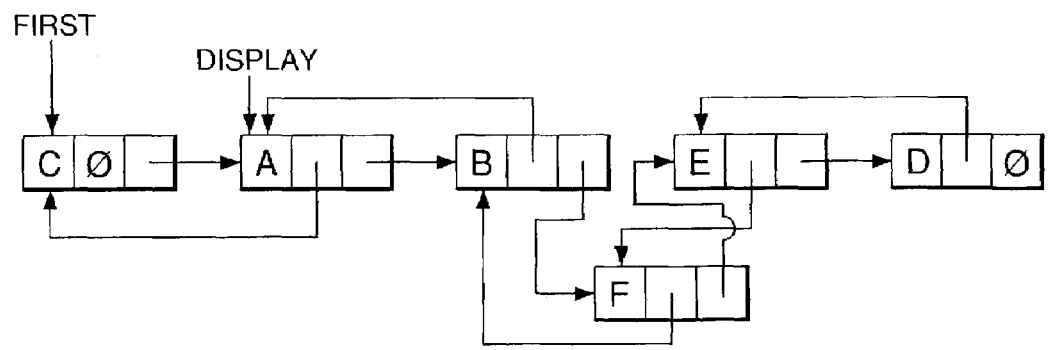
Figure 6D:
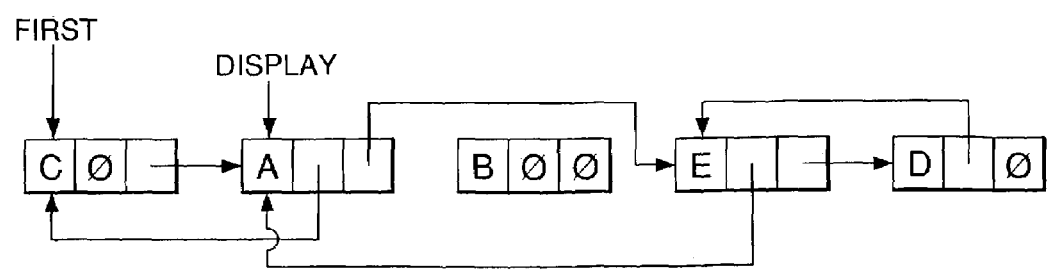

Modification of the cumulative presentation is described hereafter in connection with FIGS. 6C-6D and FIG. 7. During the display of the cumulative presentation (which is displayed on monitor 80 and/or projector/display 90 as described above), a graphical user interface is also preferably provided to the user via user control display 100 and through presentation user interface controller 40 (FIG. 1). This graphical user interface allows the user to reconfigure the cumulative presentation while the presentation is still being displayed to the audience without interruption thereof. This feature allows for a user to account for changes in the cumulative presentation order. These changes may become necessary, for example, during conferences if a speaker is a "no show," a speaker is added, a speaker is late, a new version of a presentation file is provided, or circumstances otherwise dictate a reconfiguration of the presentation order.

In one exemplary embodiment of the present system, the graphical user interface of FIG. 7 is provided in a format similar to that of the interface of FIG. 2 used to initially define the cumulative presentation order. Displayed on the left side of the graphical interface are the presentation files located at the available I/O media sources 32. For purposes of this example, the "A", "D" and "H" drives are shown available. The "D" drive is shown to be empty, indicating that no compact disk is present in the drive. For example, after a presentation is copied to the presentation apparatus 20 from this drive, the compact disk is removed and returned to the presenter. The "Dr_E_Presentation.PPT" file is shown in the "H" drive in this example because it is a network drive that is still available. A new presentation—"Dr_F_Presentation.PPT" is shown in the "A" drive. For purposes of this example, the Dr_F presentation is a new presentation not included in the original cumulative presentation and made available through a floppy disk inserted in drive A during the display of the cumulative presentation.

The predefined cumulative presentation order is shown displayed on the right side of the graphical user interface, e.g., dialog box or window interface, of FIG. 7. The individual presentation from the cumulative presentation currently being displayed is shown highlighted in the user interface. In this example, Dr_A_Presentation is currently being displayed. This event corresponds to the lined list shown in FIG. 6B. Control buttons, i.e., "reorganize", "add" and "delete", are also shown on the bottom portion of the graphical interface, the function of which is described below.

Assume that a user wants to add the Dr_F_Presentation file to the cumulative presentation list for display after the Dr_B_Presentation and before the Dr_E_Presentation without interrupting the cumulative presentation, i.e., Dr_A_Presentation is currently being displayed. For purposes of the graphical user interface, this may be accomplished by dragging the name of the Dr_F_Presentation file from the left hand side of the interface to the desired location between presentation order spots 3 and 4 of the presentation list. The display is then updated for the user to represent the new presentation order, i.e., C, A, B, F, E, then D. As described above in connection with step 108 (FIG. 3), the selected presentation file is also copied to system memory 34 or hard drive 47 for use in the cumulative presentation. This addition may also be accomplished by selecting the "add" button, then selecting the Dr_F_Presentation name and then selecting the desired inclusion location, i.e., order spot number 4. The Dr_E and Dr_F presentations are then bumped to the fifth and sixth presentation spots, respectively. It is understood that users can interact and control a graphical user interface in any number of ways, and this disclosure is provided for purpose of explanation and not for purpose of limitation.

Regardless of how the user commands or requests that the presentation—here Dr_F_Presentation—be added to the cumulative order, the linked list is modified to implement this change. Modifications to the linked list may be implemented using manipulation algorithms that should be familiar to those of ordinary skill, but these modifications are described generally hereafter for purposes of clarity. Referring to FIG. 6C, a modified linked list is shown. The first, second and last elements remain unchanged. The next element pointer of the third element is changed to point to the new element—the element corresponding to Dr_F_Presentation file. The element that previously followed the third element, i.e., the Dr_E_Presentation element, is also modified. The previous element pointer of this element is modified to point to the new element rather than the third element. The new element includes a previous element pointer that points to the third element and a next element pointer that points to the next element in the list, i.e., Dr_E_Presentation element. In this manner, the linked list is modified, and the new element is added seamlessly within the cumulative order, and thus within the cumulative presentation. The user can then direct the display of this new presentation using the user input device 60 as if it were originally included in the cumulative presentation, i.e., in response to an appropriate user command described above in connection with FIGS. 4-5, the display pointer eventually is updated to point to the new element and the corresponding presentation is displayed.

It should be understood that a new presentation element or elements can be inserted or added anywhere in the linked list. If the element is to be added before the first element in the linked list, the first element pointer must be changed to point to the new element. The original first element is provided with a previous element pointer that points to the new element (rather than a null element). The new element is provided with a null element for its previous element pointer and its next element pointer points to the original first element. Similar element changes are made to add a new element after the last element of the linked list, only with respect to the last element.

The deletion of an element from the cumulative presentation order is now described in connection with FIG. 6D. Again, with respect to user interaction, this task is accomplished through a graphical user interface such as is shown in FIG. 7. Again, the nature of the setup of the interface is not important. The user can, for example, select a presentation from the presentation order list using a user input device 60 and then select the "delete" key. Alternatively, the user can select a presentation from the displayed listing and simply drag the name from the list. Again, the linked list is modified to implement this change without interrupting the presentation from the cumulative presentation currently being displayed.

FIG. 6D illustrates the deletion of an element (specifically the third element) from the linked list. The next element pointer from the second element is changed to point to the original fourth element. The previous element pointer of the original fourth element is changed to point to the second element. The previous and next element pointers of the original third element are changed to null values. This is not a requirement, but would generally be considered good programming practice for debugging purposes. Of course, any element from the linked list can be deleted. If the first element or multiple elements from the beginning of the list are deleted, the first element pointer must be updated to reflect the new first element.

An existing list can be reorganized as well For example, the ordering can be changed from C, A, B, E, D to D, E, B, A, C, or any other combination. Again, this may be accomplished via the graphical interface of FIG. 7. For example, the user can simply drag a presentation name from the displayed list to the desired location in the list, at which point the presentation list is redisplayed with the presentation in the correct order. Alternatively, the user can select the "reorganize" button, at which point a second presentation order window opens (not shown) adjacent to the illustrated presentation order window. The user can then drag or otherwise select presentations from the original cumulative presentation list to spots in the new presentations list. Selecting the "reorganize" button again completes the modification and triggers the linked list to be modified. Reordering the linked list elements includes the steps of removing an element from the list as described above and adding the element to the desired location in the list. Of course, the removal and addition steps are performed as many times as necessary to regroup the elements into the desired ordering. The modified linked list then controls the presentation order in response to presentation commands received from the user as described above.

As explained above, in one embodiment, this feature provides the ability to edit the cumulative presentation list on a user control display 100 and display the presentation simultaneously on the monitor 80 and/or projector/display 90. Individual presentations can be added, removed and/or reordered in the cumulative presentation without interrupting the presentation from the cumulative presentation currently being displayed.

It is contemplated, however, that in one embodiment, the cumulative presentation is merely paused during reconfiguration of the cumulative presentation list. This embodiment is particularly applicable if the system 10 utilizes monitor 80 and/or projector/display 90 as the user control display. This may occur when the programmed apparatus 20 only includes one video controller. In this embodiment, the user may select a "pause" button (not shown) on presentation control device 50 and then select an "edit" button (not shown). This selection causes the control software 24 to display an edit screen, such described above in connection with FIG. 7. The user then uses user input device 60 to interact with the user interface to define a new cumulative presentation order, e.g., presentations may be added, deleted and/or reordered. When the modification is completed, an updated linked list is created and used when the presentation is restarted or un-paused, by for example, selecting the "edit" or "pause" button again on presentation control device 50. The slide that was being presented on monitor 80 and/or projector/display 90 at the time the "pause" button was first selected is then redisplayed on monitor 80 and/or projector/display 90 (rather than the editing user interface). The linked list defining the new cumulative presentation order is then used to define the presentation order during the display.

Referring again to FIGS. 1 and 2, the apparatus 20 preferably is configured to export or save the cumulative presentation to an I/O media source 32, such as a CD-R/W drive or a floppy drive. The user can select this option through the graphical user interface displayed on the user control display 100. The cumulative presentation can be saved in several different ways. In a first embodiment, the individual presentations are stored with their original file names along with a file corresponding to the linked list described above, which points to the presentation files by name. A user can then load the presentation files onto any processor programmed with presentation software (e.g., POWERPOINT VIEWER software) and open the presentation files individually. If the user has a processor programmed with that portion of control software 24 directed to displaying cumulative presentations as described above in connection with FIG. 4, Presentation Software API 26 and Presentation Software 28, then the user can view the presentations as a cumulative presentation. Alternatively, the linked list can be converted into a simple textual (or other indicia) list illustrating the cumulative presentation order. This list is copied to the I/O media source 32 along with the presentation files. Of course, this list may be used as a simple reference indicating the cumulative presentation order, or it may be converted by a processor including control software 24 into a linked list for use in display of the cumulative presentation.

In a second embodiment, the individual presentation files and the linked list associated with the cumulative presentation of the individual presentation files are again loaded, saved or otherwise transferred to an I/O media source 32. In this embodiment, however, the file names are renamed at least in part to correspond to their ordering in the cumulative presentation, i.e., "file0001.ppt", "file0002.ppt", "file0003.ppt" etc. The linked list is modified accordingly (or a new linked list is created) to reflect the name changes; In this manner, a user can then load the presentation files onto any processor programmed with presentation software (e.g., POWERPOINT VIEWER software) and open the presentation files individually. Unlike the first embodiment, however, the user can discern the correct ordering of the presentations by their respective names, thereby virtually recreating a cumulative presentation. In many cases, conventional PC software will also list such files names in the correct order when commanded to do so. Of course, if the user has a processor programmed with that portion of control software 24 directed to displaying cumulative presentations as described above in connection with FIG. 4, Presentation Software API 26 and Presentation Software 28, then the user can view the presentations as a seamless cumulative presentation.

In yet another embodiment, the presentation files are concatenated by the display apparatus 22 into a single presentation file, e.g., a single ".ppt" file having a plurality of individual presentation slides in the order of the cumulative presentation. This concatenating functionality is presently built into the POWERPOINT software (as distinguished from POWERPOINT VIEWER software). This file is then loaded, saved or otherwise transferred to an I/O media source 32. In this manner, a user can then load the presentation files onto any processor programmed with presentation software (e.g., POWERPOINT VIEWER software) and open a single presentation file to view as a seamless cumulative presentation.

The save feature allows the user to make the cumulative presentation portable and provides great flexibility in combination with the dynamic modification features described above. The user may choose to wait until the cumulative presentation is finished to utilize the save feature. This allows the user to capture any modifications to the cumulative presentation (and thus the linked list) made during display of the presentation (e.g., additions or deletions of individual presentations, or reordering thereof).

Some other features of an exemplary system 10 and presentation apparatus 20 are now described. In one embodiment, the programmed processor 20 allows the user to add transitions between presentations. Again, this option may be provided to the user through a graphical user interface displayed to the user on user control display 100. The user may select from a plurality of transitions, such as a blank screen, a graphic design, a logo page, etc. If the same transition for each presentation in the cumulative presentation is selected, whether it be a blank screen, logo, etc., the transition screen is displayed whenever the user moves to the next presentation as described above in connection with FIG. 4. This may be accomplished by inserting the screen as an element in the linked list between each presentation element. Alternatively, assuming there is a common insert screen that is to be inserted at each transition, it does not need to be stored within the linked list. Instead, a variable can be used to indicate that a screen is to be displayed at every transition. This variable can be consulted when the transition is encountered. If the variable is set, the insert screen is displayed. A second variable would be used to indicate which screen is to be displayed during the transition. Alternatively, the user can select a different transition screen for each individual presentation or some individual presentations. In that event, the user can simply add the transition screen as an entry in the cumulative order list. The file corresponding to the screen can be selected from an I/O media source 32 as described above The programmed processor 20 also preferably allows the user to define bookmarks during presentation of an individual presentation for the cumulative presentation. For example, as shown in FIG. 5, an exemplary presentation control device 50 may include a "bookmark" key 520. Assume that a slide from a presentation in the cumulative presentation is currently being displayed on the projector/display 90. If the user decides that he or she (or another user) may desire to quickly return to the slide later in the presentation of the cumulative presentation, the user can select the bookmark key 520. By selecting this key, the location of the slide within the cumulative presentation is stored by the control software 24. At any later point, i.e., when a different slide from the same or a different presentation is being displayed, a user can again select the bookmark key 50. By selecting this key 50, the control software saves the location of the slide presently being displayed and then displays the bookmarked slide. Basically, the slide number and pathname (if needed) are provided to the presentation software 28 by the control software 24 at step 410 of FIG. 4. If the user selects the bookmark button again, the control software retrieves the location information for the previously displayed slide and uses this information to redisplay that slide. In one embodiment, the programmed processor 20 also allows the user to set multiple bookmarks, each functioning as described above.

Although FIG. 1 shows that the programmed process is separate from the peripherals, such as the monitor 80, projector/display 90 and user control display 100, this is for purposes of illustrations only. It is contemplated that the programmed processor 20 and peripherals may form a part of an integral device.

The system described above provides a user-friendly and flexible means of preparing a cumulative presentation, displaying a cumulative presentation and modifying a cumulative presentation. Much of this may be accomplished with or without a user interface and using even as few as one or two "clicks" of a user input device 60 and/or presentation control device 50. A plurality of presentations can be displayed as a cumulative presentation in a seamless manner, and the cumulative presentation can be modified without interrupting a presentation from the cumulative presentation being displayed. The system eliminates awkward transitions between presentations, allows the user to save a cumulative presentation, and can function with a plurality of different sources of media files. Still further, the system relieves the inflexibility inherent in prior art systems that rely upon preprogrammed, static textual play lists.

In one embodiment, some functionality of the control software 24 may be moved to a peripheral device that interacts with control software 24 via an API. In such an embodiment of system 10, the control software 24 of the programmed processor is associated with an API such that a portable or other control device may interface therewith and enhance the capabilities of the processor 20, such as to provide the ability to manage and organize or reorganize the cumulative presentation at the peripheral device, while the programmed processor 20 and central processing unit 22 direct the ongoing display and maintain storage of the presentations. For example, a cumulative presentation order can be developed or modified in any manner at the peripheral and then be provided to the control program 24 in a standard format. The control program 24 can then convert the provided presentation order into a linked list as described above, which is then used in the display of the cumulative presentation as described above. It is assumed that the presentations defined in the cumulative presentation order by the peripheral are available to the control processor via I/O media sources 32. Alternatively, the media files may be transferred to the control processor 24 from the peripheral device. In this manner, control of the cumulative presentation can be implemented through processor 20 and presentation control device 50, while the cumulative presentation can be developed and/or modified before and during the cumulative presentation using a peripheral device that effectively implements the functionality of the user input device 60 and the user interface displayed on the user control display 100 This feature allows a user at a location remote from the processor 20, such as at a different location in a meeting room (e.g., a registration desk), to interact with the processor 20 to update and modify the cumulative presentation order.

In yet another embodiment of the system 10, a processor 20 serves as an I/O media source 32. Cumulative presentation lists, individual presentations, timeout values, transition slides, and other data can be transferred from a first processor 20 to a second processor 20. This information may be transferred over a phone line or other communication link, for example. This facilitates the sharing of information, as well as coordinating presentations in multiple venues. The signal from video controller 38 or a display command may also be transmitted to a remote processor 20 for display to a remote audience.

In another embodiment of the system 10, programmed processor 20 allows the user to add, delete and reorder slides within an individual presentation that is included within a cumulative presentation. This feature allows users to make last minute changes to the individual slideshow without the need to edit the PowerPoint file. One implementation of this feature is embodied by creating a doubly linked list corresponding to the slides within an individual presentation (in addition to creating a linked list corresponding to the order of the individual presentations within the cumulative presentation). Each element of the list corresponds to a slide and includes a previous slide pointer and a next slide pointer. A pointer identifies the first slide in the list and the current slide being displayed. The user is presented with a user interface similar to, for example, the dialog interface of FIG. 2, only specific to the slides of an individual presentation. Through the interface, the user defines a new ordering for the individual sides within a selected presentation. The actual presentation file is not modified, but the control software 24 directs that a doubly linked list be created embodying the slide ordering directed by the user. This slide ordering is then used in the presentation process illustrated in FIG. 4 and described above.

For example, assume there are five slides in a selected presentation—slide 1, slide 2, slide 3, slide 4 and slide 5. The user may select a new presentation order within that presentation as follows—slide 1, slide 2, slide 4 slide 3 and slide 5. This new order is represented in a linked list that is created. When slide 2 is displayed and the user commands the display of the next slide (by selecting right arrow key 519, for example) a slide presentation pointer is updated in the linked list to point to the next slide pointed to in the linked list—slide 4 —and the display command provided at step 410 commands the display of slide 4 from the presentation. Without this linked list, slide 3 would be displayed. A slide or slides may also be deleted using a similar mechanism.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the invention has been described in terms of exemplary embodiments, it is not limited thereto. Rather, the appended claims should be construed broadly, to include other variants and embodiments of the invention that may be made by those skilled in the art without departing from the scope and range of equivalents of the invention.

What is claimed is:

1. A method of organizing a plurality of presentations, each of the plurality of presentations including a plurality of presentation slides, each of the presentation slides having content for display, and displaying the content of the presentation slides from the plurality of presentations to an audience as a cumulative presentation, comprising the following steps:

providing through a user interface a listing of available individual presentation files, each of said presentation files corresponding to a respective presentation from the plurality of presentations;

querying a user through said user interface to select presentations corresponding to said available individual presentation files and order the selected presentations as units into a selected presentation order for later display to the audience, under user control, of the content of the selected presentations as part of the cumulative presentation;

displaying in said user interface a listing of presentations selected by said user for use during the cumulative presentation to the audience; and presenting said cumulative presentation on a display to the audience in accordance with said selected presentation order, wherein in presenting said cumulative presentation the presentation files corresponding to said selected presentations are maintained for individual execution by a presentation software application to display their content, wherein the selection of a presentation as a unit through the user interface by the user for use as part of said cumulative presentation automatically designates the presentation file corresponding to that presentation for later execution by the presentation software application and automatically provides access to the user during presentation of the cumulative presentation to the audience to all of the plurality of presentation slides from that selected presentation for selective display of the content of those presentation slides using the presentation software application under user control.

2. The method of claim 1, wherein said providing said listing step includes the step of receiving a listing of available individual presentation files from at least one input source and displaying said listing to said user in said user interface.

3. The method of claim 2, further comprising, prior to said presenting step, copying presentation files corresponding to the selected presentations to local storage from respective input sources, wherein said presentation software application executes said files from said local storage in displaying the content of the presentations to the audience.

4. The method of claim 1, wherein said presenting step comprises:

in response to a first command received from said user, providing to said presentation software application an identification of a first presentation file corresponding to a first presentation identified in said selected presentation order and a command to display a first slide from said first presentation file.

5. The method of claim 4, wherein said presenting step further comprises:
   in response to a second command received from said user, providing to said presentation software application a command to display a second slide.

6. The method of claim 5, further comprising the steps of:
   determining if said second slide is from a presentation file different than said first presentation file; and
   if said slide is from a presentation file different than said first presentation file, providing to said presentation software application an identification of said different presentation file.

7. The method of claim 4, wherein said first presentation file is a POWERPOINT presentation file and said presentation software application is a POWERPOINT software application.

8. The method of claim 5, further comprising the steps of:
   receiving said first command from a first input device configured to interface with said user interface; and
   receiving said second command from a second input device.

9. The method of claim 5, further comprising the steps of:
   receiving a selection of said presentations in response to said querying from a first input device configured to interface with said user interface; and
   receiving said first and second commands from a second input device.

10. The method of claim 3, further comprising the step of copying presentation files corresponding to each of the selected presentations from said local storage to a storage medium.

11. The method of claim 10, wherein each of said presentation files copied to said storage medium is provided with a respective file name representative of its corresponding presentation's order in said cumulative presentation.

12. The method of claim 10, further comprising the step of copying to said storage medium a list identifying an ordering of said selected presentations in said cumulative presentation.

13. The method of claim 12, wherein said list is a linked list.

14. The method of claim 2, further comprising the steps of:
    concatenating each of said presentations selected for display as part of said cumulative presentation into a single presentation file; and
    copying said single presentation file to a storage medium.

15. The method of claim 1, further comprising the steps of:
    before said presenting step, querying said user through said user interface to modify said selected presentation order of the selected presentations; and
    displaying a modified listing of presentations in a modified selected presentation order in response to a modification command received from said user through said user interface, said modification command directing that a selected presentation be added for use during display of said cumulative presentation to the audience, a selected presentation be deleted from use during display of said cumulative presentation to the audience or presentations for use during display of said cumulative presentation to the audience be reordered.

16. The method of claim 15, further comprising the step of creating a presentation order control file representative of said modified listing of presentations.

17. The method of claim 16, wherein said control file is a linked list.

18. The method of claim 1, further comprising the step of creating a presentation order control file, said control file representing the selected presentation order, wherein said presenting step presents said cumulative presentation using said control file.

19. The method of claim 18, wherein said presentation control file comprises a linked list with pointers identifying said selected presentation files.

20. The method of claim 1, wherein the step of maintaining said presentation files comprises maintaining said presentation files as discrete files for individual execution by said presentation software application.

21. The method of claim 5, wherein said presentation step further comprises:
    displaying a final slide from said first presentation file;
    after displaying said final slide, receiving a command from said user to increment to a next slide;
    providing to said presentation software application an identification of a second presentation file corresponding to a second presentation from said selected presentation order and a command to display a slide from said second presentation file.

22. A method of manipulating a presentation order of presentations selected for use during display of a cumulative presentation to an audience, each presentation comprising a plurality of presentation slides having content for display and corresponding to a presentation file which is executed by a presentation software application to display the content, comprising the following steps:
    presenting said cumulative presentation on a display to the audience using a presentation order control file, said control file representing a selected presentation order of said selected presentations, wherein in presenting said cumulative presentation the presentation files corresponding to said selected presentations are maintained for individual execution by the presentation software application to display their content, said presenting step comprising displaying a slide from a first selected presentation from said presentations with said presentation software application;
    during said display of said slide from said first selected presentation, providing to a user through a user interface a listing of said presentations selected for use as part of said cumulative presentation; and
    without interrupting said display of said slide, reconfiguring said presentation order of said presentations selected for use as part of said cumulative presentation in response to a reconfiguration command received from said user, wherein the presentations are selected and ordered as units through the user interface in configuring and reconfiguring said presentation order,
    wherein the selection of a presentation as a unit through the interface for use as part of said cumulative presentation automatically designates the presentation file corresponding to that presentation for later execution by the presentation software application and automatically provides access to the user during presentation of the cumulative presentation to the audience to all of the plurality of presentation slides from that selected presentation for selective display of the content of those presentation slides using the presentation software application under user control.

23. The method of claim 22, wherein said presentation order control file is a linked list, wherein said reconfiguring step includes the following steps:
    modifying said linked list to conform to a new presentation order defined by said user.

24. The method of claim 23, wherein said modifying step includes the step of removing a presentation file from said linked list.

25. The method of claim 23, wherein said modifying step includes the step of adding a presentation file to said linked list.

26. The method of claim 25, further comprising the steps of:
- receiving a listing of at least one newly available individual presentation file from an input source;
- displaying said listing of at least one newly available presentation file to said user, said listing including said added presentation file; and
- copying said added presentation file to local storage from said input source.

27. The method of claim 23, wherein said modifying step includes the step of reordering presentation files from said linked list.

28. The method of claim 23, wherein said list is a doubly linked list, and said modifying step includes the step of modifying at least one of a previous pointer and a next pointer for at least one element in said doubly linked list.

29. The method of claim 22, wherein displaying said first presentation comprises:
- providing a first slide from said first presentation to a display for display; and
- after said reconfiguring step, providing a second slide from said first presentation to said display for display.

30. The method of claim 22, wherein said reconfiguring step includes the step of removing a presentation from said presentation order.

31. The method of claim 22, wherein said reconfiguring step includes the step of adding a presentation to said presentation order.

32. The method of claim 22, wherein said reconfiguring step includes the step of reordering said presentations within said presentation order.

33. A cumulative presentation system, comprising:
- a presentation apparatus, said presentation apparatus comprising:
  - a user control display;
  - means for providing through a user interface on said user control display a listing of available individual presentation files, each of said presentation files corresponding to a respective presentation comprising a plurality of presentation slides having content for display;
  - means for querying a user through said user interface to select presentations corresponding to said available individual presentation files and order the selected presentations as units into a selected presentation order for later display of content from said selected presentations to an audience as part of a cumulative presentation to the audience;
  - means for displaying in said user interface a listing of presentations selected by said user for use during said cumulative presentation to the audience; and
  - means for presenting said cumulative presentation on a display to the audience in accordance with said selected presentation order, wherein in presenting said cumulative presentation the presentation files corresponding to said selected presentations are maintained for individual execution by a presentation software application to display their content, wherein the selection of a presentation as a unit through the user interface by the user for use as part of said cumulative presentation automatically designates the presentation file corresponding to that presentation for later execution by the presentation software application and automatically provides access to the user during presentation of the cumulative presentation to the audience to all of the plurality of presentation slides from that selected presentation for selective display of the content of those presentations slides using the presentation software application under user control.

34. The system of claim 33, wherein said presentation apparatus includes a plurality of input sources for receiving available individual presentation files.

35. The system of claim 34, wherein said presentation apparatus includes means for copying presentation files corresponding to the selected presentations to local storage from respective input sources, wherein said presentation software application executes said files from said local storage.

36. The system of claim 33, wherein said presenting means includes means responsive to a first command received from said user for providing to said presentation software application an identification of a first presentation file corresponding to a first presentation identified in said selected presentation order and a command to display a first slide from said first presentation file.

37. The system of claim 36, wherein said presenting means further comprises means responsive to a second command received from said user for providing to said presentation software application a command to display a second slide.

38. The system of claim 37, wherein said presenting means determines if said second slide is from a presentation file different than said first presentation file and, if said slide is from a presentation file different than said first presentation file, provides to said presentation software application an identification of said different presentation file.

39. The system of claim 38, wherein said first presentation file is a POWERPOINT presentation file and said presentation software application is a POWERPOINT software application.

40. The system of claim 37, further comprising:
- a user input device for receiving said first command; and
- a presentation control device for receiving said second command.

41. The system of claim 37, further comprising:
- a user input device for receiving the selection of said presentations for use in said cumulative presentation, said user input device configured to interface with said user interface; and
- a presentation control device for receiving said first and second commands.

42. The system of claim 35, wherein said presentation apparatus further comprises means for copying presentation files corresponding to each of the selected presentations from said local storage to a storage medium.

43. The system of claim 42, wherein each of said presentation files copied to said storage medium is provided with a respective file name representative of its corresponding presentation's order in said cumulative presentation.

44. The system of claim 42, wherein said presentation apparatus further comprises means for copying to said storage medium a list identifying an ordering of said selected presentations in said cumulative presentation.

45. The system of claim 44, wherein said list is a linked list.

46. The system of claim 35, wherein said presentation apparatus further comprises:
- means for concatenating each of said presentations selected for display as part of said cumulative presentation into a single presentation file; and means for copying said single presentation file to a storage medium.

47. The system of claim 33, wherein said presentation apparatus further comprises
means for querying said user through said user interface before said presenting step to modify said selected presentation order of the selected presentations; and
means for displaying a modified listing of presentation files in a modified selected presentation order in response to a modification command received from said user through said user interface, said modification command directing that a selected presentation be added for use during display of said cumulative presentation to the audience, a selected presentation be deleted from use during display of said cumulative presentation to the audience or presentations for use during display of said cumulative presentation to the audience be reordered.

48. The system of claim 47, wherein said presentation apparatus further comprises means for creating a presentation order control file representative of said modified listing of presentations files.

49. The system of claim 48, wherein said control file is a linked list.

50. The system of claim 36, wherein said presenting means further includes:
means for, after displaying a final slide from said first presentation file and in response to a command received from said user to increment to a next slide, providing to said presentation software application an identification of a second presentation file corresponding to a second presentation from said selected presentation order and a command to display a slide from said second presentation file.

51. The system of claim 27, further comprising means for creating a presentation order control file, said control file representing the selected presentation order, wherein said presenting means presents said cumulative presentation using said control file.

52. The system of claim 51, wherein said presentation control file comprises a linked list with pointers identifying said selected presentation files.

53. A presentation system for presenting a cumulative presentation to an audience of selected presentations in a selected presentation order, each presentation comprising a plurality of presentation slides having content for display and corresponding to a presentation file which is executed by a presentation software application to display the content, comprising:
a presentation apparatus comprising:
a user control display;
means for presenting said cumulative presentation on a display to the audience using a presentation order control file, said control file representing a selected presentation order of said selected presentations, wherein in presenting said cumulative presentation the presentation files corresponding to said selected presentations are maintained for individual execution by the presentation software application to display their content, said presenting means comprising means for displaying a slide from a first selected presentation from said presentations with said presentation software application;
means for, during said display of said slide from said first selected presentation, providing to a user through a user interface on said user control display a listing of said presentations selected for use as part of said cumulative presentation; and
means for reconfiguring said presentation order of said presentations selected for use as part of said cumulative presentation in response to a reconfiguration command received from said user without interrupting said display of said slide, wherein the presentations are selected and ordered as units through the user interface in configuring and reconfiguring said presentation order,
wherein the selection of a presentation as a unit through the user interface for use as part of said cumulative presentation automatically designates the presentation file corresponding to that presentation for later execution by the presentation software application and automatically provides access to the user during presentation of the cumulative presentation to the audience to all of the plurality of presentation slides from that selected presentation for selective display of the content of those presentation slides using the presentation software application under user control.

54. The system of claim 53, wherein said control file is a linked list, said presentation apparatus further comprising means for modifying said linked list to conform to a new presentation order defined by said user.

55. The system of claim 54, wherein said presentation apparatus comprises means for removing a presentation file from said linked list.

56. The system of claim 54, wherein said presentation apparatus comprises means for adding a presentation file to said linked list.

57. The system of claim 56, wherein said presentation apparatus comprises:
means for receiving a listing of at least one newly available individual presentation file from an input source;
means for displaying said listing of at least one newly available presentation file to said user, said listing including said added presentation file; and
means for copying said added presentation file to local storage from said input source.

58. The system of claim 54, wherein said presentation apparatus comprises means for reordering presentation files from said linked list.

59. The system of claim 54, wherein said list is a doubly linked list, and said presentation apparatus includes means for modifying at least one of a previous pointer and a next pointer for at least one element in said doubly linked list.

60. The system of claim 53, wherein said presenting means comprises means for providing a second slide from said first presentation after said presentation order is reconfigured.

61. The system of claim 60, wherein said presentation apparatus further comprises:
a user input device for receiving said reconfiguration command; and
a presentation control device for receiving a command for displaying said second slide.

62. The system of claim 53, wherein said reconfiguring means includes means for removing a presentation from said presentation order.

63. The system of claim 53, wherein said reconfiguring means includes mean for adding a presentation to said presentation order.

64. The system of claim 53, wherein said reconfiguring means includes means for reordering said presentation within said presentation order.

65. A method of organizing a plurality of presentations, each of said plurality of presentations including a plurality of presentation slides having content for display, each of said presentations corresponding to a respective presentation file, and displaying the content of the presentation slides from said plurality of presentations to an audience as a cumulative presentation, comprising the following steps:

initiating presentation of said cumulative presentation to an audience on a first display in accordance with a presentation order control file, said control file representing a presentation order of presentations selected for display to the audience in said cumulative presentation, wherein in presenting said cumulative presentation files corresponding to the selected presentations are maintained as discrete files for individual execution by a presentation software application;

in response to a first command received from a user, providing to said user through a user interface displayed on a second display a listing of the selected presentations;

reconfiguring said presentation order of said presentations in said listing in response to a reconfiguration command received from said user;

creating a modified control file representative of said reconfigured presentation order; and continuing presentation of said cumulative presentation on said first display in accordance with said modified control file, wherein presentations are selected for use in said cumulative presentation and ordered in the reconfigured presentation order as units through the user interface, wherein the selection of a presentation as a unit through the user interface automatically designates the presentation file corresponding to that presentation for later execution by the presentation software application and automatically provides access to the user during presentation of the cumulative presentation to the audience to all of the plurality of presentation slides from that selected presentation for selective display of the content of those presentation slides using the presentation software application under user control during.

66. The method of claim 65, wherein said control file and modified control file are linked lists.

67. A cumulative presentation system:

a presentation apparatus, said presentation apparatus comprising:
    a user control display for displaying a graphical user interface;
    a processor programmed with a presentation software application; and
    control means comprising:
      means for providing through said user interface a listing of available presentations, each of said presentations corresponding to a respective presentation file and comprising a plurality of presentation slides having content forming a presentation for display by executing the corresponding presentation file using the presentation software application;
      means for prompting said user through said user interface to arrange individual presentations from said available individual presentations as units into a selected presentation order for later display of content from said selected presentations to an audience as part of a cumulative presentation to the audience, wherein the selection of a presentation as a unit through the user interface by the user for use as part of said cumulative presentation automatically designates the presentation file corresponding to that presentation for later execution by the presentation software application and automatically provides access to the user during the presentation of the cumulative presentation to the audience to all of the plurality of presentation slides from that selected presentation for selective display of the content of those presentation slides using the presentation software application under user control; and
      means for presenting said cumulative presentation on a display to the audience in accordance with said selected presentation order, said presenting means receiving an identification from said user of a presentation and a slide from said identified presentation for display and instructing said presentation software application to display said slide.

68. The system of claim 67, further comprising:

means for creating a presentation order control file, said control file comprising a linked list of elements representing presentations selected by said user and said selected presentation order and comprising a display pointer, wherein said presenting means uses said control file, wherein in presenting said cumulative presentation files corresponding to presentations in said selected presentation order are maintained as discrete files for individual execution by said presentation software application.

69. The system of claim 67 further comprising:

a display for presenting said cumulative presentation;

a user input device for interfacing with said user interface; and a presentation control device for receiving commands from said user for controlling the presentation of said cumulative presentation.

70. The system of claim 67, wherein said presenting means determines a total number of slides in said identified presentation, wherein in response to a command from said user to increment to a next slide, said presenting means determines if a slide currently being displayed is the final slide in said identified presentation, and if said slide is the final slide, determining a next presentation in said selected presentation order and instructing said presentation software application to display a first slide from said next presentation.

* * * * *